3,119,761
METHOD FOR PREPARING THERMOSETTING
RESINOUS MATERIALS
John E. Maier, St. Paul, Minn., assignor to Minnesota
Mining and Manufacturing Company, St. Paul, Minn.,
a corporation of Delaware
No Drawing. Filed Dec. 21, 1959, Ser. No. 860,627
5 Claims. (Cl. 208—22)

This invention relates to the preparation of normally solid, boron-containing, partially-cured, thermosetting, hydrocarbonaceous resinous materials.

It is an object of this invention to teach a new method for preparing thermosetting hydrocarbonaceous resinous materials which have excellent thermal and chemical stability as thermoset compositions. These materials may be employed by themselves or in admixture with other materials, such as fillers and the like. Especially useful compositions are admixtures of these materials with other thermosetting, heat-curable resins. These compositions may be utilized in the manufacture of reinforced plastic laminates, ablation applications such as in the manufacture of nose cones and rocket nozzles and as friction particles or binders such as in the manufacture of brake linings and transmission or clutch surfaces. Heretofore normally solid, partially-cured, thermosetting hydrocarbonaceous resinous materials have been prepared by treating hydrocarbon pitches with oxidizing agents.

It has now been discovered that a similar class of resins, i.e., boron-containing, may be prepared by heating hydrocarbon pitches in the presence of boron trioxide. Obviously the reaction mechanism is not the same as that obtained in the utilization of oxidizing agents since boron trioxide is not an oxidizing agent.

The normally solid, boron-containing, partially-cured, thermosetting hydrocarbonaceous resinous material prepared by the process of this invention has a softening point of 140 to 250° C., preferably 150 to 200° C., contains 25 to 60 percent by weight benzene-soluble components, preferably 35 to 50 percent and has a combined boron content of 4 to 10%, preferably 6 to 9%. These hydrocarbonaceous resinous materials are prepared from hydrocarbon pitches. The preferred hydrocarbon pitches have a melting point in the range of 50 to 200° C. (preferably 75 to 150° C.), and have a solubility in benzene of at least 70 percent by weight. The hydrocarbon pitches utilized may also be identified as polynuclear aromatic-containing pitches which are essentially benzene-soluble, such as coal tar pitches, residues from the aromatization of petroleum products and residues from the manufacture of phenols. The chemical modification of the partially-cured, thermosetting hydrocarbonaceous resinous material is evidenced by the reduced benzene solubility of the partially-cured resin. In most cases the benzene solubility of the partially-cured product will be at least 10% lower than that of the hydrocarbon starting material.

Generally speaking, the process of this invention is carried out by heating the hydrocarbon pitch at an elevated temperature of 200 to 300° C., preferably 220 to 280° C., in the presence of 15 to 35% boron trioxide (preferably 20 to 30%) over an extended period of time to obtain the desired softening point. At the lower temperatures and shorter reaction periods, products having softening points as low as 140° C. are obtained. While the materials may be mixed at room temperature, it is preferable to add the boron trioxide after the hydrocarbon pitch has been heated to about 150° C.

This invention may be illustrated further by reference to the following examples in which all "parts" are expressed as parts by weight and all "percentages" are expressed as percent by weight, unless otherwise specified.

*Example 1*

Coal tar pitch having a melting point of about 100° C. and which was 75% soluble in benzene was mixed with 25% by weight of boron trioxide ($B_2O_3$). The mixture was heated and stirred for 12 hours at 250° C. to produce a boron-containing, heat-curable, partially-cured, thermosetting, hydrocarbonaceous resinous material. This resin had an acetone extractable fraction of 50%, a benzene extractable fraction of 25% and a water extractable fraction of 24%. The softening point (Parr bar) of this resin was 189° C.

Similar resins were prepared by reacting a mixture containing 15% boron trioxide for 20 hours at 250° C. and 20% boron trioxide for 20 hours at 250° C.

A thermoset resin was prepared by curing at 500° F. for 4 hours a partially-cured, hydrocarbonaceous, resinous material containing about 8% combined boron. The resulting thermoset resin contained 24% acetone extractable constituents and had a volatile loss of less than 2% when heated at 700° F. for one hour and 22% after an additional hour of heating at 1000° F.

A substantial portion of the boron content of the partially-cured hydrocarbonaceous resinous material is extractable by prolonged contact with boiling water.

*Example 2*

This example shows the preparation of thermoset copolymers from the resins prepared in accordance with this invention.

A. *Phenolic resin preparation.*—To a mixture of phenol (100 parts) and sulfuric acid (1 part) as a catalyst was added slowly formaldehyde (67 parts of a 37% aqueous solution) so as to maintain the temperature of the reactants at 100° C. The reaction mixture was then refluxed for 30 minutes and dehydrated at 120° C. and 25 mm. mercury pressure. The resulting resin had a softening point of 65° C. and could be pulverized at room temperature.

B. *Thermoset copolymer preparation.*—The boron-containing, partially-cured, thermosetting hydrocarbonaceous resinous material prepared in the presence of 25% boron trioxide was mixed with equal parts of the phenolic resin prepared as described in A above. This mixture after being pulverized was cured in an aluminum pan at 500° F. for 4 hours to produce a hard resilient thermoset copolymer containing 12% acetone extractables and which had a volatile loss of 5% when heated for one hour at 700° F. and a volatile loss of 16% when heated for an additional hour at 1000° F.

Similar copolymers were obtained by curing the boron-containing, partially-cured, hydrocarbonaceous materials with thermosetting cashew nut shell liquid alkylated phenolic resins, urea-formaldehyde resins, melamine-formaldehyde resin, and an epoxy resin.

I claim:

1. A process for preparing a partially cured, thermosetting, hydrocarbonaceous resinous material having a softening point of 140 to 250° C. and containing 25 to 60% of benzene-soluble components which comprises mixing a polynuclear aromatic-containing hydrocarbonaceous pitch with boron trioxide and heating the mixture at an elevated temperature.

2. A process for preparing a partially-cured, thermosetting, hydrocarbonaceous resinous material having a softening point of 140 to 250° C. and containing 25 to 60% of benzene-soluble components which comprises mixing a polynuclear aromatic-containing hydrocarbonaceous pitch with 15 to 35% boron trioxide and heating the mixture at an elevated temperature.

3. A process for preparing a partially-cured, thermosetting hydrocarbonaceous resinous material having a softening point of 140 to 250° C. and containing 25 to 60% of benzene-soluble components which comprises mixing a polynuclear aromatic-containing hydrocarbonaceous pitch with boron trioxide and heating the mixture at an elevated temperature of 200 to 300° C.

4. A process for preparing a partially-cured, thermosetting, hydrocarbonaceous resinous material having a softening point of 150 to 200° C. and containing 35 to 50% of benzene-soluble components which comprises mixing a polynuclear aromatic-containing hydrocarbona-pitch heated to an elevated temperature of at least 150° C. with 10 to 25% boron trioxide and heating the mixture at an elevated temperature of 200 to 300° C.

5. A boron-containing, partially-cured, thermosetting, polynuclear aromatic-containing hydrocarbonaceous resinous material having a softening point of 140 to 250° C. containing 25 to 60% benzene-soluble components, said material having been prepared by the process in claim 1.

References Cited in the file of this patent

UNITED STATES PATENTS

| | | |
|---|---|---|
| 2,179,208 | Burk et al. | Nov. 7, 1939 |
| 2,339,108 | Pier et al. | Jan. 11, 1944 |
| 2,992,835 | Winslow | July 18, 1961 |

UNITED STATES PATENT OFFICE
CERTIFICATE OF CORRECTION

Patent No. 3,119,761                  January 28, 1964

John E. Maier

It is hereby certified that error appears in the above numbered patent requiring correction and that the said Letters Patent should read as corrected below.

Column 3, line 9, for "hydrocarbona-" read -- hydrocarbon --.

Signed and sealed this 30th day of June 1964.

(SEAL)
Attest:

ERNEST W. SWIDER
Attesting Officer

EDWARD J. BRENNER
Commissioner of Patents